United States Patent [19]

Gronwick et al.

[11] 4,069,751
[45] Jan. 24, 1978

[54] COFFEE BREWING APPARATUS

[75] Inventors: Jerry P. Gronwick, Park Ridge; Robert J. Augustine, Downers Grove, both of Ill.

[73] Assignee: Sunbeam Corporation, Chicago, Ill.

[21] Appl. No.: 758,226

[22] Filed: Jan. 10, 1977

[51] Int. Cl.² .............................................. A23F 1/00
[52] U.S. Cl. ....................................................... 99/306
[58] Field of Search ................ 99/275, 279, 287, 295, 99/298–300, 304–306, 323; 210/453–455, 482

[56] References Cited
U.S. PATENT DOCUMENTS

| 2,716,937 | 9/1955 | Milano | 99/306 |
| 3,174,424 | 3/1965 | Serio | 99/299 |
| 3,374,897 | 3/1968 | Martin | 210/455 |
| 3,985,069 | 10/1976 | Cavalluzzi | 99/295 |

Primary Examiner—Leonard D. Christian
Attorney, Agent, or Firm—George R. Clark; Neil M. Rose; Clifford A. Dean

[57] ABSTRACT

Apparatus for brewing small quantities of coffee in a receptacle which may be used for a drinking mug or serving vessel, the brewing portion of the apparatus being detachably mounted so that a portion thereof extends within the mug and including a brewing basket and liner adapted to utilize a disposable paper filter. The liner having a capacity substantially equal to the portion of the receptacle below the brewing apparatus and being provided with a spreader plate at its bottom which limits the expansion of the coffee grounds when the liner and basket are locked together.

10 Claims, 6 Drawing Figures

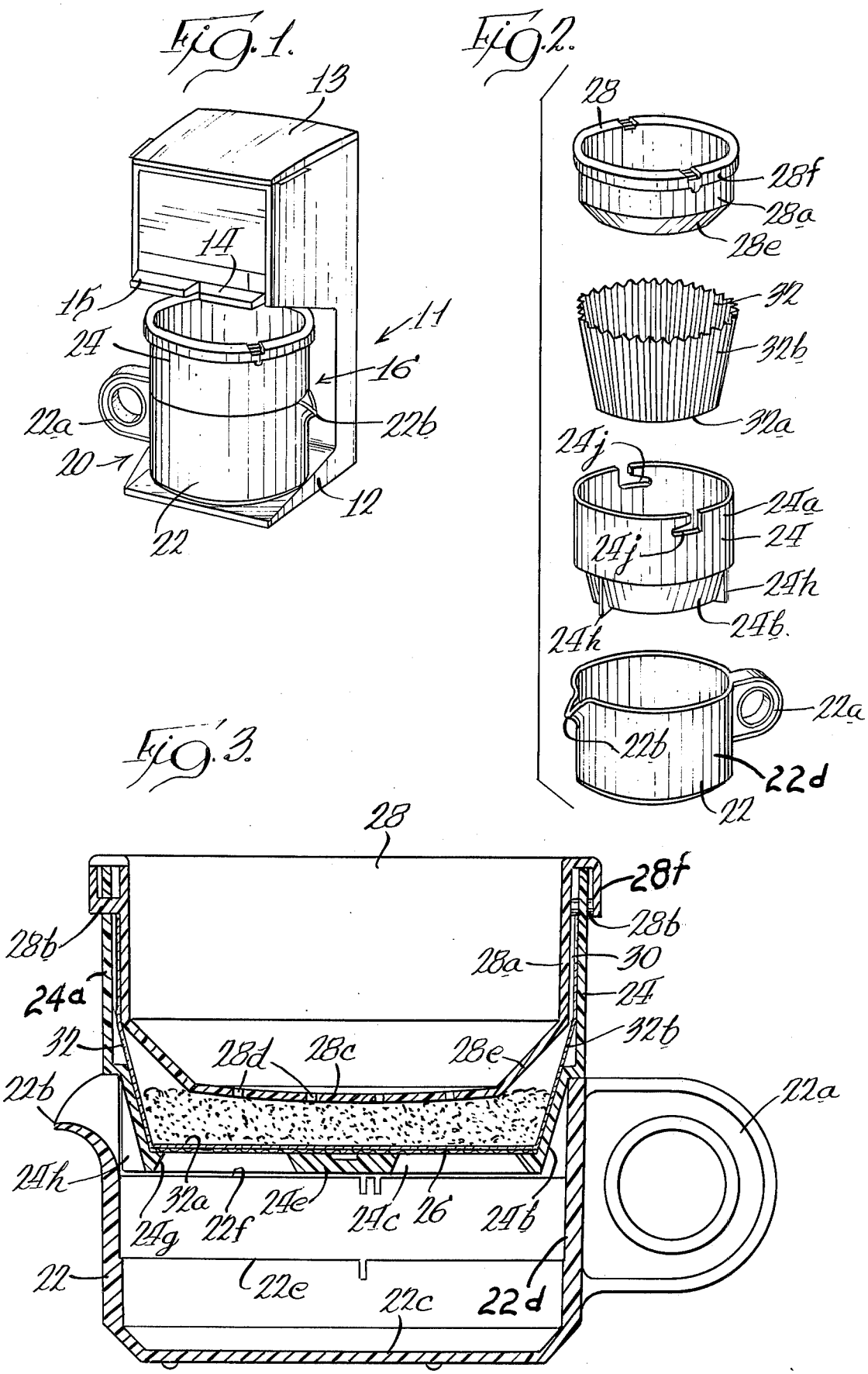

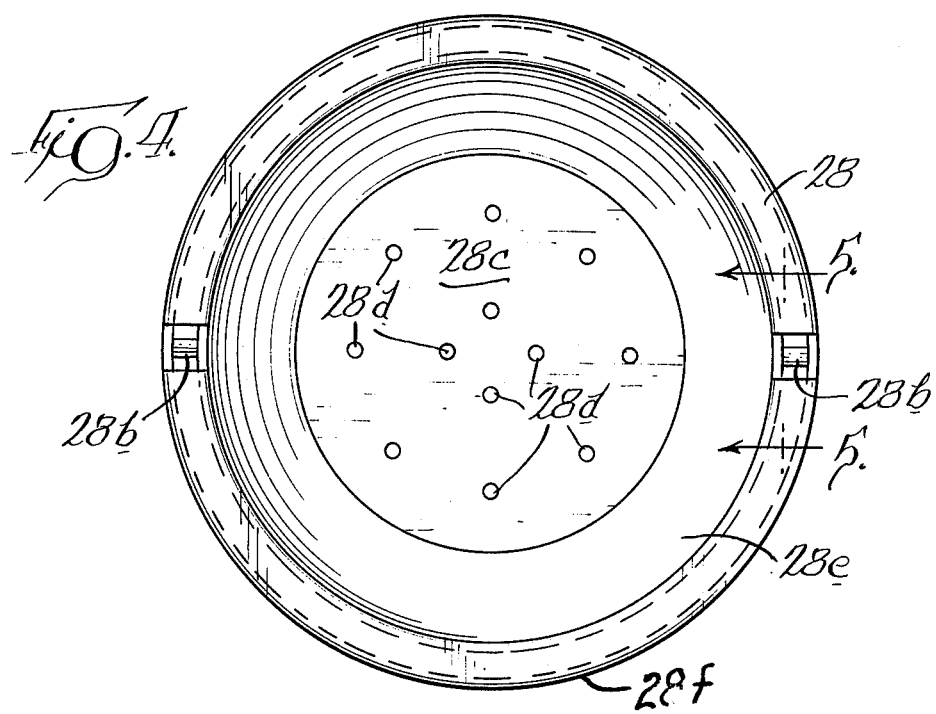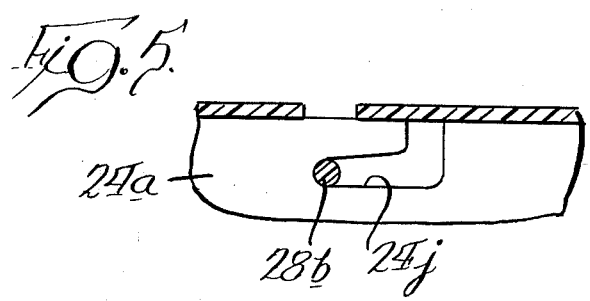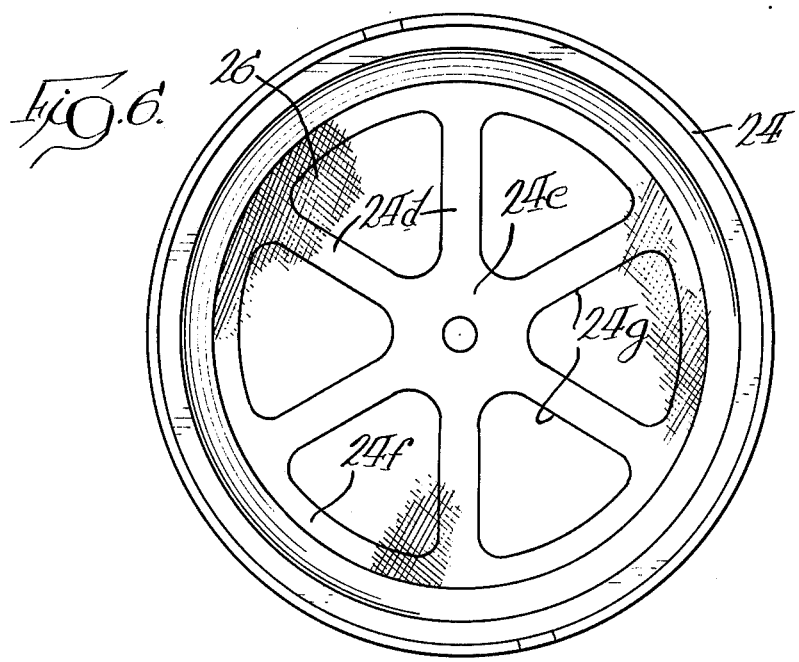

COFFEE BREWING APPARATUS

BACKGROUND OF THE INVENTION

There has long been a demand for coffee brewing apparatus which would permit one to prepare a cup or two of brewed coffee in a simple, economical fashion. Currently known apparatus of this type include some type of coffee basket for receiving the coffee grounds and brewing the coffee and a filter for separating the grounds from the brewed coffee. This apparatus is simply mounted or received on a cup or other suitable small vessel.

Examples of such coffee brewing apparatus are shown in the patents to Michielsen, U.S. Pat. No. 3,389,650, Rombouts, U.S. Pat. No. 3,094,917, Dale, U.S. Pat. No. 2,899,310, and Milano, U.S. Pat. No. 2,716,937.

Many of these prior art coffeemakers include an arrangement in which the coffee grounds are enclosed in a water permeable, disposable container which resembles a tea bag. The coffee grounds of sufficient quantity to make one cup of coffee, for instance, are encapsulated in a filter material which is disposable along with the grounds. The main objections to this type of approach is the fact that it is considerably more expensive to purchase coffee grounds which have been encapsulated in the filter material, and the quantity of coffee grounds cannot be varied. Alternatively, it is advantageous to purchase the coffee in the conventional 1 or 2 pound quantities and purchase the filter elements separately.

One of the principal problems involved in brewing small quantities of coffee is the difficulty in getting the hot water to become intimately associated with all of the grounds in order to obtain efficient extraction of the coffee. If a small quantity of coffee is placed in the basket of a conventional drip coffee maker or percolator, there is difficulty in wetting the grounds so that they do not simply float to the surface of the water with little extraction taking place. In addition, there is a tendency for the water to form channels through a thin bed of coffee, and extraction of coffee will be achieved in only limited areas of the bed of grounds. It is for this reason that most present approaches to the brewing of a cup or two of coffee in a drip coffeemaker involve the use of the encapsulated grounds as described above.

Another difficulty in regard to apparatus for brewing coffee directly into a drinking receptacle is the fact that such apparatus tends to be very unstable and would tip over very easily. The apparatus would be rather tall and would be placed in the top of a conventional coffee cup, as is illustrated in U.S. Pat. No. 3,615,708 to Abile-Gal. It would be preferable to provide brewing apparatus which would have a low center of gravity and which would reduce the tendency to tip over.

BRIEF DESCRIPTION OF THE INVENTION

The invention involves a combined coffee brewing and dispensing receptacle which is compact, efficient and has a very low center of gravity. The brewing apparatus itself comprises a brewing basket having cylindrical side walls and a foraminous bottom. The basket is detachably mounted on a receptacle which has generally the same diameter as the brewing basket and which is adapted to receive in the upper portion thereof the portion of the basket defining the brewing chamber.

Received within the brewing basket is a paper filter which has a flat bottom portion coextensive with the formaminous bottom of the basket and having corrugated side walls which extend upwardly around the periphery of the flat bottom. The brewing apparatus further includes a liner which, at its bottom, is formed with an apertured spreader plate and has cylindrical side walls which telescope within the side walls of the basket and receive the corrugated side walls of the filter therebetween. The portion of the liner between the spreader plate and the cylindrical side walls is angled inwardly in order to deflect the side walls of the filter outwardly into the space between the cylindrical walls of the liner and the basket. At the top edge of the liner, there is formed a downwardly facing channel which receives the upper edge of the basket side walls and interengaging means on the basket and liner are provided to lock the two together.

When coffee is placed within the brewing chamber and hot water is dispensed into the liner, the brewing process begins. As the hot water contacts the grounds, they begin to swell, thereby producing a compacted bed between the spreader plate and the disposable filter which is supported on the bottom of the basket. This compaction eliminates any tendency for the water to channel in passing through the bed of grounds and results in efficient extraction of the coffee.

It is therefore an object of the present invention to provide improved coffee making apparatus for brewing small quantities of coffee.

It is a further object of the present invention to provide an improved drip coffeemaker which is simple in construction and which provides efficient extraction of a small quantity of coffee grounds.

It is another object of the present invention to provide a compact filtering apparatus for brewing small quantities of coffee using a disposable filter element and means to confine the bed of grounds to limit the expansion of the bed of grounds when it is wetted.

Further objects and advantages of the present invention will become apparent as the following description proceeds and the features of novelty which characterize the invention will be pointed out with particularity in the claims annexed to and forming a part of this application.

BRIEF DESCRIPTION OF THE DRAWINGS

For a better understanding of the present invention, reference may be had to the accompanying drawings in which:

FIG. 1 is a perspective view of a coffee making appliance embodying our invention.

FIG. 2 is an exploded perspective view of the receptacle and brewing apparatus of FIG. 1 with the water heating means omitted.

FIG. 3 is an enlarged, vertical sectional view of the brewing apparatus of FIG. 2.

FIG. 4 is a top plan view of the brewing apparatus of FIG. 3.

FIG. 5 is an enlarged, fragmentary sectional view taken on line 5—5 of FIG. 4.

FIG. 6 is a top plan view of the basket portion of the brewing apparatus of FIG. 3.

Referring to the drawings, there is shown in FIG. 1 a coffee brewing appliance designated generally by reference numeral 11. The coffee brewing appliance 11 includes a unit 12 which serves to heat and dispense hot water. It includes a reservoir 13 and suitable controls 14 and 15 for energizing a heater contained therein and for dispensing the heated contents respectively. The heating and dispensing unit 12 further includes a recessed area 16 within which coffee brewer generally designated by reference numeral 20 is positioned. The coffee brewer 20 includes a receptacle 22 and a basket 24.

The receptacle 22 is of large diameter compared to its height and includes a handle 22a and a pouring spout 22b. It is contemplated that the receptacle 22 may be used as a drinking vessel or mug as well as for a receptacle from which to dispense into a conventional coffee cup. The vessel or receptacle 22 includes a flat bottom 22c and generally cylindrical side walls 22d. As is best shown in FIG. 3, the inside of the side walls 22d are formed with peripherally extending ridges 22e and 22f which indicate the levels to which the receptacle 22 should be filled to obtain one or two cups, respectively, of coffee. When the user is interested in brewing two cups of coffee, he would fill the receptacle 22 to the index line 22f and then pour the contents of the receptacle into the reservoir 13 of the water heating and dispensing unit 12. The receptacle 22 is typically formed of a moldable plastic material.

As is best shown in the sectional view of FIG. 3, the basket 24 is adapted to rest or seat on the upper edges of the cylindrical side walls of the receptacle 22. The basket 24 includes cylindrical side walls 24a which are of essentially the same diameter as the side walls 22d of the receptacle 22. Projecting downwardly into the receptacle 22 is the bottom portion 24b of the basket 24. The portion 24b defines, in part, the brewing chamber within which the coffee grounds are deposited and within which the coffee brewing takes place. The portion 24b is provided with a bottom 24c which includes a plurality of radiating spokes 24d connected to a center portion 24e as is best shown in FIG. 6. The spokes 24d along with a rim portion 24f define a plurality of segmentally-shaped openings 24g across which is positioned a fine nylon or polyester mesh filter 26. The nylon or polyester filter 26 may be used as a primary filter in connection with the coffee making operation but preferably serves as a support for a conventional paper filter and also as a secondary filter.

Immediately adjacent the bottom edge of the cylindrical side walls 24a of the basket 24, the walls defining the bottom portion 24b angle inwardly, as is evident from FIG. 3. This permits the portion of the basket 24 forming the brewing chamber to be received entirely within the receptacle 22 and the brewing chamber is positioned above the level of the liquid which will be deposited in receptacle 22 during the brewing operation. Thus, the bottom 24c of the basket 24 is at a level slightly above the indicia mark 22f for the two cup level.

To increase the stability of the basket 24 as supported in the mouth of the receptacle 22, there are provided triangularly-shaped, radially extending walls 24h, there being three around the periphery of the basket 24 equally spaced from one another. Only one is visible in FIG. 3. The radial walls 24h are positioned closely adjacent the inside of the receptacle walls 22d and tend to restrain tipping or displacement of the basket 24 with respect to the receptacle 22.

Received within the basket 24 is a generally cup-shaped liner 28. The liner 28 is formed with cylindrical side walls 28a which are of smaller diameter than the basket side walls 24a, thereby providing an annular space 30 between the liner 28 and the basket 24. Around the upper edge of the side walls 28a of liner 28, there is provided a downwardly facing channel 28f which receives the upper edge of the basket side walls 24a.

In order to retain the basket 24 and liner 28 is assembled relationship, there is provided bayonet-like retention means which includes L-shaped slots 24j formed in the basket side walls 24a and radial lugs 28b formed in the liner 28 and best shown in FIGS. 3, 4 and 5. As is best illustrated from the sectional view of FIG. 5, the lugs 28b may be moved into engagement with the L-shaped slots 24j in the basket 24, and upon relative rotation of the liner 28 with the basket 24, the lugs 24b are moved to the positions shown in FIG. 5 where the horizontal portion of the slots 24j restrain the liner 28 against axial movement with respect to the basket 24.

The liner 28 is formed with a slightly dished but generally horizontal bottom portion 28c which also serves as a spreader plate. In this connection, the bottom 24c is formed with two rings of apertures 28d which serve to distribute and meter the water passing from the interior of the liner 28 into the bed of coffee positioned immediately therebelow. Interconnecting the spreader plate 28c and the side walls 28a of the liner 28 is an angled wall 28e, which is generally conical in shape for a purpose to be described in greater detail below.

In using the appliance 11, the receptacle 22 is first filled with the desired amount of water utilizing the indicia 22e and 22f. This water is then poured into the reservoir 13 of the heating and dispensing unit 12. The basket 24 is then placed in position in the receptacle 22. For the purpose of filtering the brewed coffee, a conventional paper filter 32 having a flat bottom 32a and generally corrugated side walls 32b is utilized. The filter 32 is positioned within the basket 24, as shown in FIG. 3, with the bottom portion 32a substantially coextensive with the bottom 24c of the basket 24. At this point, the measured amount of coffee grounds suitable for brewing the desired amount of coffee is dispensed into the bottom of the filter 32. Thereafter, the liner 28 is inserted telescopically into the basket 24, the lugs 28b entering into the L-shaped slots 24j and being rotated to secure the liner 28 with respect to the basket 24. As the liner 28 is inserted into the basket 24, the angled wall 28e on the liner biases the top of the side walls 32b of the filter outwardly into the space 30 defined between the liner 28 and the basket 24. This sandwiching of the filter between the two cylindrical side walls tends to support the filter and prevent its collapsing as it becomes saturated with water during the brewing operation.

After receptacle 22, and basket 24 and the liner 28 are assembled together with the paper filter 32 and the coffee grounds positioned within the brewing chamber, the coffee brewer 20 is inserted into the recess 16. The heater control 14 is then actuated causing the water within the reservoir 13 to be heated in a relatively short time. As soon as the water has been heated to the appropriate temperature, as indicated by an appropriate signal light on the unit 12, the control 15 is operated causing the heated water to be dispensed into the liner 28. The liner 28 is made of such capacity that it can receive and contain the entire two cups of coffee being brewed. As an alternative to using the water heating and dispensing unit 12, the water could simply be heated by other means such as in a tea kettle and poured into the liner 28. As soon as the hot water is introduced into the liner 28, it begins its metered flow through the apertures 28d into the bed of coffee grounds at various positions around the bed. The space forming the brewing chamber between the basket bottom 24c and the spreader plate 28c is so limited that the coffee grounds on being wetted tend to expand and become compressed therein assuring that the water will not be channeled as sometimes happens in a loose and thin bed of grounds and assuring that the entire volume of grounds will be well wetted for good extraction of the coffee. The twelve openings in the spreader plate have been selected to provide good distribution of the hot water throughout the bed of grounds and also to meter the water passing through the grounds to obtain a suitable brew time of on the order of three to four minutes.

While there has been shown and described a particular embodiment of the present invention, it will be apparent to those skilled in the art that various changes and modifications may be made without departing from the invention in its broader aspects, and it is, therefore, contemplated in the appended claims to cover all such changes and modifications as fall within the true spirit and scope of the present invention.

What is claimed as new and desired to be secured by Letters Patent of the United States is:

1. A coffee making apparatus comprising a coffee basket having a cup-shaped configuration with the bottom wall thereof being formed with coffee discharge openings, filter means extending across said openings to block the discharge of coffee grounds, a basket liner having a shape complementary to said basket and being formed to be telescopically received within said basket to form a brewing chamber between the bottom of said liner and the upper surface of the bottom of said basket, assembly means on said basket and said liner to lock said basket and liner against relative movement, said basket liner having cylindrical side walls and a flat bottom formed with spaced apertures to provide a spreader plate for hot water delivered to said liner, said spreader plate metering the flow of water to said brewing chamber, a cup-shaped disposable filter having a flat bottom and corrugated side walls, said disposable filter being positioned within said brewing chamber with said flat bottom of said disposable filter coextensive with said filter means and said walls of said disposable filter being received between said liner side walls and said basket side walls.

2. The coffee making apparatus of claim 1 wherein said brewing chamber is of limited capacity having only enough volume to contain the amount of coffee grounds required to brew an amount of coffee equal to the volume of said liner, said grounds being compressed during the brewing operation to prevent channeling of the water through the grounds.

3. The coffee making apparatus of claim 1 wherein said liner is provided at the top of said side walls with an outwardly disposed, downwardly facing channel which receives the top of the side walls of said basket, locking members extending across said channel at spaced positions on said liner, L-shaped slots in the top of said basket side walls, said locking members being insertable into said slots to lock said basket and liner together upon rotation of said liner with respect to said basket.

4. The coffee making apparatus of claim 1 wherein said basket and said liner are formed with cylindrical side walls and inwardly angled side walls interconnecting the bottom of said cylindrical side walls with the bottom of said basket and said liner respectively, said angled side walls on said liner deflecting said disposable filter side walls outwardly into the space between said basket and liner cylindrical side walls as said liner is assembled to said basket.

5. A combined brewing and serving apparatus for coffee comprising a receptacle having cylindrical side walls and a flat bottom, a brewing basket having cylindrical side walls of the same diameter as said receptacle and having a portion defining a brewing chamber below said cylindrical side walls, said brewing basket being removably mounted on said receptacle with said basket walls coaxial with and abutting said receptacle, the portion of said basket defining said brewing chamber being positioned within said receptacle and having an apertured bottom wall, a basket liner received within said basket and having substantially the same volumetric capacity as the portion of said receptacle below said brewing chamber, said liner having a bottom wall with apertures therein to provide a spreader plate, means locking said basket and liner together to compress coffee grounds between the bottom wall of said basket and said spreader plate.

6. The combination of claim 5 including a disposable filter received within said basket, said filter having a flat bottom which is coextensive with said bottom wall of said basket, said basket bottom wall defining the bottom of said brewing chamber and being porous to permit rapid discharge of brewed coffee therethrough, said liner having cylindrical side walls in coaxial relation to said basket side walls, said disposable filter having corrugated side walls which are received between the cylindrical side walls of said liner and said basket.

7. The combination of claim 6 wherein said basket and said liner are formed with inwardly and downwardly angled walls being of conical shape interconnecting said cylindrical side walls of said basket and said liner with said basket bottom wall and said liner bottom wall respectively, said basket angled walls being formed with walls extending outwardly radially with respect to the axis of said basket into engagement with said receptacle to stabilize said basket with respect to said receptacle.

8. The combination of claim 6 wherein said basket bottom wall includes a plurality of ribs which support a fine mesh filter which may serve as a primary filter or a secondary filter as used in combination with said disposable filter.

9. The combination of claim 5 wherein said basket bottom wall is provided with a fine plastic mesh filter which obstructs the apertures in said basket bottom wall to filter the liquid passing from said basket to said receptacle, cooperating means in said basket and on said liner to support a cup-shaped disposable filter with its bottom coextensive with said mesh filer and its sides supported in an upright position.

10. The combination of claim 9 wherein said cooperating means comprise the spaced cylindrical side walls of said basket and said liner.

* * * * *